(12) United States Patent
Buchner (10) Patent No.: US 10,685,463 B1
(45) Date of Patent: Jun. 16, 2020

(54) SYSTEMATIC SCENARIO VISUALIZATION

(71) Applicant: Baker Hughes Oilfield Operations LLC, Houston, TX (US)

(72) Inventor: Bjorn Buchner, Delft (NL)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 16/286,178

(22) Filed: Feb. 26, 2019

(51) Int. Cl.
*G06T 11/20* (2006.01)
*G06T 11/60* (2006.01)
*G06F 9/451* (2018.01)

(52) U.S. Cl.
CPC ............ *G06T 11/206* (2013.01); *G06F 9/451* (2018.02); *G06T 11/60* (2013.01)

(58) Field of Classification Search
CPC ......... G06T 11/206; G06T 11/60; G06F 9/451
See application file for complete search history.

(56) References Cited

U.S. PATENT DOCUMENTS

| 5,632,009 A | * | 5/1997 | Rao | ........................ | G06T 11/206 715/201 |
| 2004/0135809 A1 | * | 7/2004 | Lehman | ................. | G06Q 30/02 715/767 |
| 2015/0254214 A1 | * | 9/2015 | Rosenberg | ............... | G09B 5/06 715/202 |

* cited by examiner

*Primary Examiner* — Chong Wu
(74) *Attorney, Agent, or Firm* — Mintz Levin Cohn Ferris Glovsky and Popeo, P.C.

(57) ABSTRACT

In one implementation, a method can include receiving data characterizing a plurality of scenarios. A first scenario of the plurality of scenarios can include a first plurality of models associated with a plurality of model types. The method can also include determining a first visual representation of the first scenario for display in a graphical user interface (GUI) display space. The first visual representation can include a first plurality of graphical objects indicative of the first plurality of models. The first plurality of graphical objects can be arranged in a plurality of columns indicative of the plurality of model types. The first plurality of graphical objects can be connected by a first line. A first path of the first line in the GUI display space can be based on one or more grids. The method can further includes displaying, in the GUI display space, the first visual representation.

20 Claims, 9 Drawing Sheets

SYSTEMATIC SCENARIO VISUALIZATION

BACKGROUND

An industrial operation (e.g., oil and gas extraction) can include multiple scenarios indicative of various characteristics of the industrial operation (e.g., subsurface properties). Scenario planning can be used to make plans (e.g., long-term plans) for an organization, such as within an industrial oil and gas operation. Scenario planning methods can be based on the idea that multiple factors can influence a decision making process (e.g., decision making for an industrial process). Scenario planning can allow for inclusion of a degree of uncertainty based on changing properties of elements in a scenario. In some implementations, scenario planning can be integrated with a systems thinking approach to scenario development which is sometimes referred to as dynamic scenarios. Scenario planning can help a planner to anticipate the impact of different scenarios, identify weaknesses, and develop a desirable plan.

SUMMARY

Various aspects of the disclosed subject matter may provide one or more of the following capabilities.

In an aspect, a method can include receiving data characterizing a plurality of scenarios. A first scenario of the plurality of scenarios can include a first plurality of models associated with a plurality of model types. The method can also include determining a first visual representation of the first scenario for display in a graphical user interface (GUI) display space. The first visual representation can include a first plurality of graphical objects indicative of the first plurality of models. The first plurality of graphical objects can be arranged in a plurality of columns indicative of the plurality of model types. The first plurality of graphical objects can be connected by a first line. A first path of the first line in the GUI display space can be based on one or more grids including a first number of rows indicative of number of the plurality of scenarios. A first row and a first column of each of the one or more grids can be assigned to the first line. The method can further includes displaying, in the GUI display space, the first visual representation.

One or more of the following features can be included in any feasible combination.

For example, the method can include determining a second visual representation of a second scenario of the plurality of scenarios. The second scenario can include a second plurality of models associated with the plurality of model types. The second visual representation can include a second plurality of graphical objects indicative of the second plurality of models. The second plurality of graphical objects can be arranged in the plurality of columns. The second plurality of graphical objects can be connected by a second line. A second path of the second line in the GUI display space can be based on the one or more grids. A second row and a second column of each of the one or more grids can be assigned to the second line. The method can further include displaying, in the GUI display space, the second visual representation.

In some implementations, the first plurality of models and the second plurality of models can include a common model. The first plurality of graphical objects and the second plurality of graphical objects can include a common graphical object representative of the common model. The common graphical object can be connected to the first line and the second line in the GUI display space. In another implementation, a size of the common graphical object can be proportional to a number of scenarios of the plurality of scenarios that can include the common model. In yet another implementation, the first line can be characterized by a first color indicative of the first scenario and the second line can be characterized by a second color indicative of the second scenario.

In some implementations, the method can include determining the first path of the first line. Determining the first path can include assigning a first row of a first grid of the one or more grids and a first column of the first grid to the first scenario, and assigning a first row of a second grid of the one or more grids and a first column of the second grid to the first scenario. The method can also include determining the second path of the second line. Determining the second line can include assigning a second row of the first grid and a second column of the first grid to the second scenario, and assigning a second row of the second grid and a second column of the second grid to the second scenario. The first path of the first line can include the first row and the first column of the first grid and the first row and the first column of the second grid, and the second path of the second line can include the second row and the second column of the first grid and the second row and the second column of the second grid.

In some implementations, a first graphical object of the first plurality of graphical objects can be displayed in a first column of the plurality of columns and a second graphical object of the first plurality of graphical objects can be displayed in a second column of the plurality of columns. The first grid and the second grid can be displayed in a third column of the plurality of columns. The first visual representation can includes the first column, the second column and the third column and the third column can be located between the first column and the second column. In another implementation, the first line and the second line intersect at right angles. The first line can be configured to overlay the second line at the intersection of the first line and the second line. In another implementation, the method can further include determining that the first line overlays the second line based on a predetermined index indicative of priorities associated with the plurality of scenarios. The predetermined index can include a first priority value associated with the first scenario and a second priority value associated with the second scenario.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, and the like.

These and other capabilities of the disclosed subject matter will be more fully understood after a review of the following figures, detailed description, and claims.

BRIEF DESCRIPTION OF THE FIGURES

These and other features will be more readily understood from the following detailed description taken in conjunction with the accompanying drawings, in which.

DETAILED DESCRIPTION

Envisioning multiple scenarios can allow for improving a decision-making process. Scenarios can be representative of uncertainty associated with multiple plausible states (e.g., characteristics of a subsurface during oil and gas exploration and production). The uncertainty can arise due to lack of sufficient information needed to create an accurate model (e.g., model of a subsurface). For example, in oil and gas exploration, there can be an uncertainty associated with the properties of a subsurface, and arious subsurface scenarios can be related to properties (e.g., faults, structure, and the like) of the subsurface. A given subsurface scenario can include multiple models associated with the properties of subsurface. In some implementations, a given property of the subsurface can be described by multiple models which can be indicative of uncertainty associated with the given property. The scenario of an existing state can include multiple models indicative of various characteristics of the state.

A visual representation (e.g., a diagram) of the various scenarios can allow a user (e.g., a decision-maker of an operation) to understand the existing state of the scenario and make decisions for the future. However, as the complexity of the scenario (e.g., uncertainty associated with the scenario) increases (e.g., due to multiple possible scenario's, multiple models associated with the scenarios, and the like), it can be cumbersome and inefficient to generate the visual representations of the scenarios using existing techniques. Moreover, the generated representations may be complicated and therefore hard to decipher. Accordingly, improved systems and methods for generating visual representation of scenarios are described that can allow of efficient generation of visual representations (e.g., by a computing device) that are less complex, easy to decipher and scalable (e.g., compared to existing approaches to generating visual representations).

The systems and methods described in this application can improve a graphical user interface (GUI) display space by providing a systematic and clear visualization of scenarios (e.g., uncertainty scenarios). For example, a scenario including multiple models that can be represented by interconnected graphical objects in the GUI display space. A visual representation of scenarios (e.g., uncertainty scenarios) can simultaneously include multiple interconnected graphical objects that are representative of characteristics of the scenarios. Properties of the visual representation (e.g., shape and/or size of the graphical objects, color and/or path of the interconnecting lines, grouping of graphical objects in columns, and the like) can efficiently present relationship information to a user. The path of the interconnecting lines can be systematically determined using one or more grids. This can be done, for example, by assigning distinct rows and columns of a grid to the various scenarios such that the path of an interconnecting line of a given scenario overlaps the assigned row and/or column of a grid.

Determining the path of the interconnecting line based on assigned rows and columns of a grid can improve the existing visual representation of a scenario. For example, the visual representation can have improved accessibility (e.g., easy to understand) to a user by reducing overlap and/or intersection of lines representative of different scenarios. Unlike existing representations of scenarios (e.g., uncertainty scenario), the visual representations described in this application can be repeatable and scalable. For example, a new scenario can be added by assigning a new row and column of the grid to the new scenario. Additionally or alternately, new model types can be added to existing scenarios and/or new models can be added to existing model types while maintaining the accessibility of the visual representation to a user.

Figure 1:
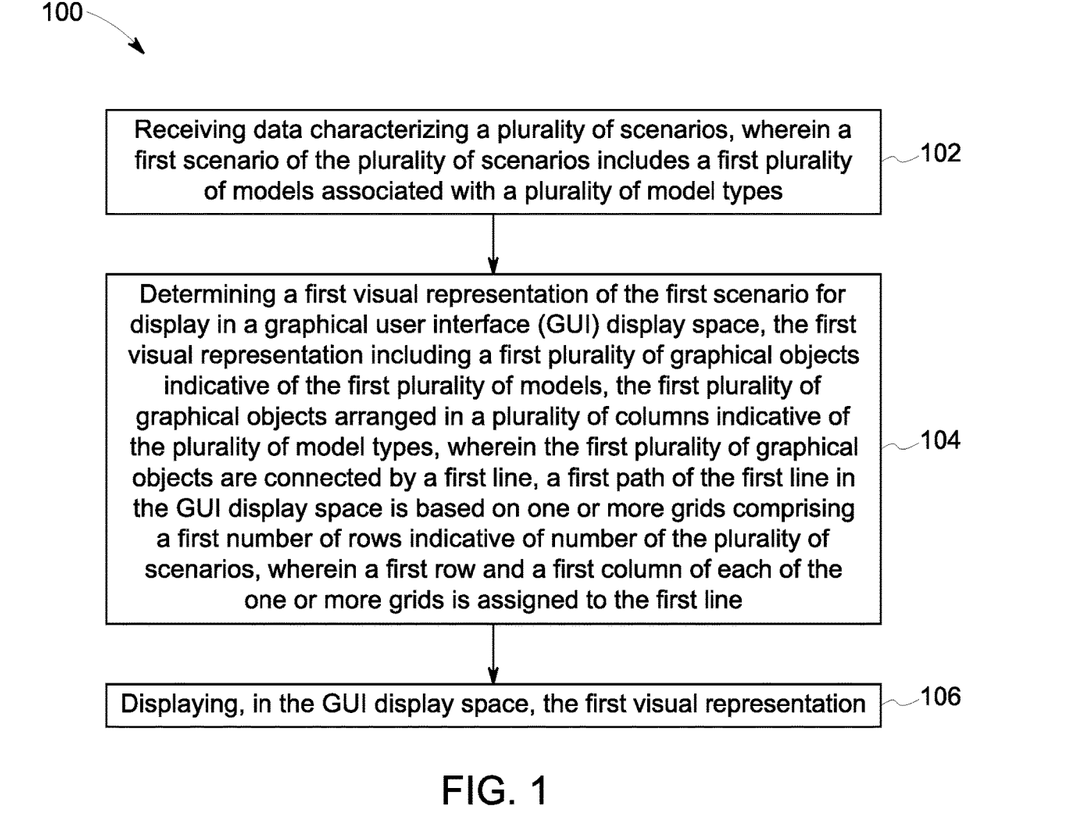
FIG. 1 is a flow chart of an exemplary method for visualization of scenarios in a graphical user interface (GUI) display space.

FIG. 1 is a flow chart of an exemplary method for visualization of scenarios in a graphical user interface (GUI) display space that can enable improved visualization of scenarios which can be easy to understand (e.g., by reducing the overlap and/or intersection of lines representative of scenarios). At 102, data characterizing a plurality of scenarios (e.g., scenarios of an industrial process) can be received. The data of scenarios can include multiple models. A characteristic can be represented by a model type that can include one or more models. The data can include, for example, the total number of scenarios, models and model types associated with the various scenarios, and the like.

At 104, a first visual representation of a first scenario of the plurality of scenarios can be determined. The first visual representation can be displayed in a GUI display space. The first visual representation can include a plurality of graphical objects that can be indicative of the models in the first scenario. The graphical objects of the first representation can be arranged (e.g., in columns) in the GUI display space. The arrangement can be based on the model types of the models in the first scenario (e.g., each column can include graphical objects of models of a predetermined model type). The graphical objects of the first visual representation can be connected by a line (e.g., having a predetermined color and/or property).

Figure 2:
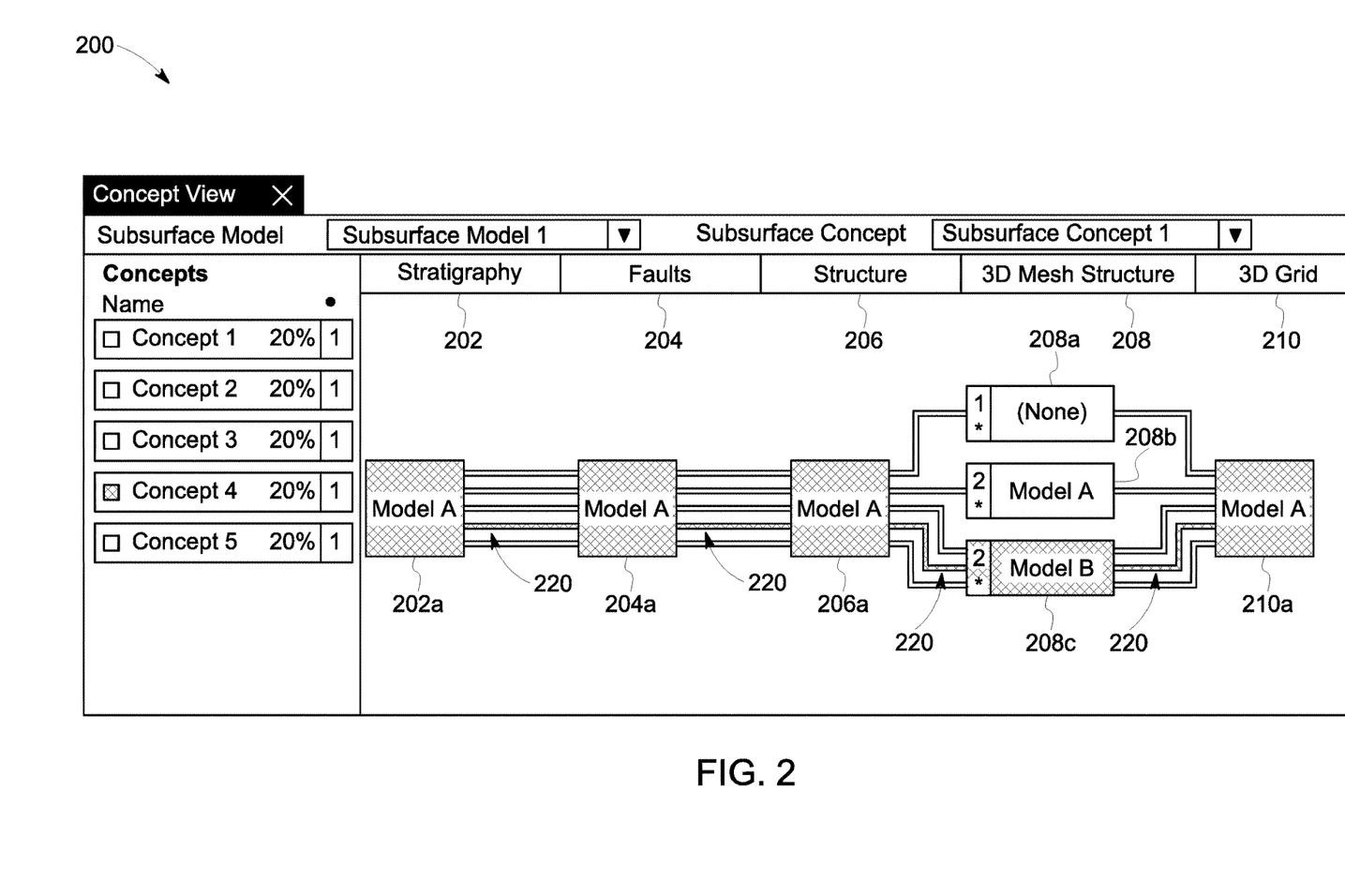
FIG. 2 illustrates an exemplary visual representation of a scenario.

FIG. 2 illustrates an exemplary visual representation 200 of a scenario. The visual representation 200 includes multiple columns 202-210 that can be representative of different model types (e.g., stratigraphy, faults, structure, 3D mesh structure, 3D grid, and the like). A given model type can include one or more models that can be represented by graphical objects (e.g., a polygon). For example, a stratigraphy model type represented by the column 202 can include a single graphical object 202a, and the 3D mesh structure model type represented by the column 208 can include multiple graphical objects 208a-c. The graphical objects representative of the first scenario can be connected by a line (e.g., line 220). In other words, a first visual representation of the first scenario can include graphical objects 202a, 204a, 206a, 208c and 210a connected by the interconnecting line 220 (color coded green).

Figure 3:
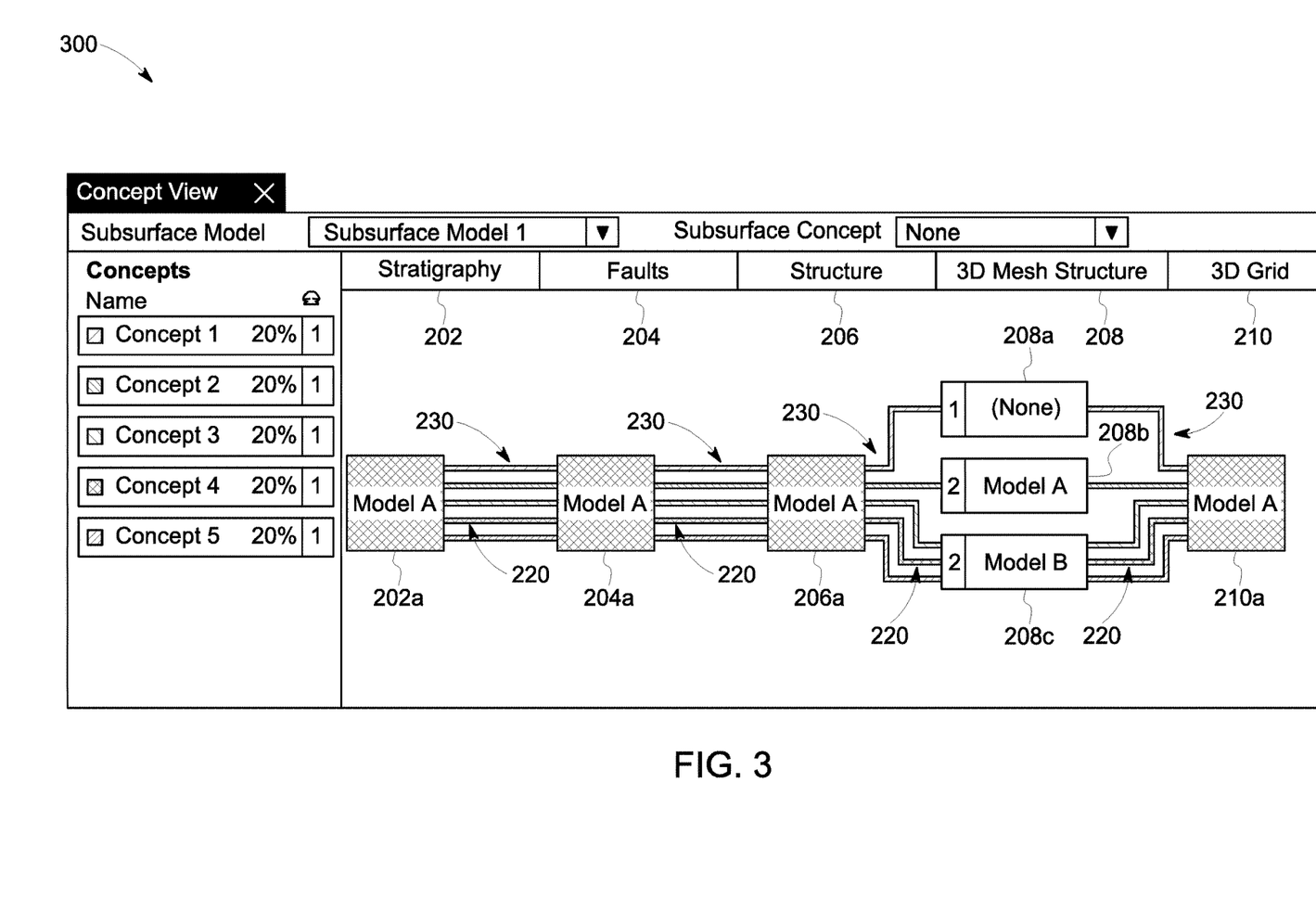
FIG. 3 illustrates an exemplary visual representation of multiple scenarios that include the visual representation of FIG. 2.

FIG. 3 illustrates an exemplary visual representation 300 that includes the first visual representation of FIG. 2. The visual representation 300 includes visual representations of multiple scenarios that can be distinguished based on a property of the lines (e.g., line color). The visual representation of multiple scenarios can include common graphical objects (representative of common models in the scenario). For example, a second visual representation (representative of a second scenario) can include graphical objects 202a, 204a, 206a, 208a and 210a connected by the interconnecting line 230 (color coded red).

Figure 4:
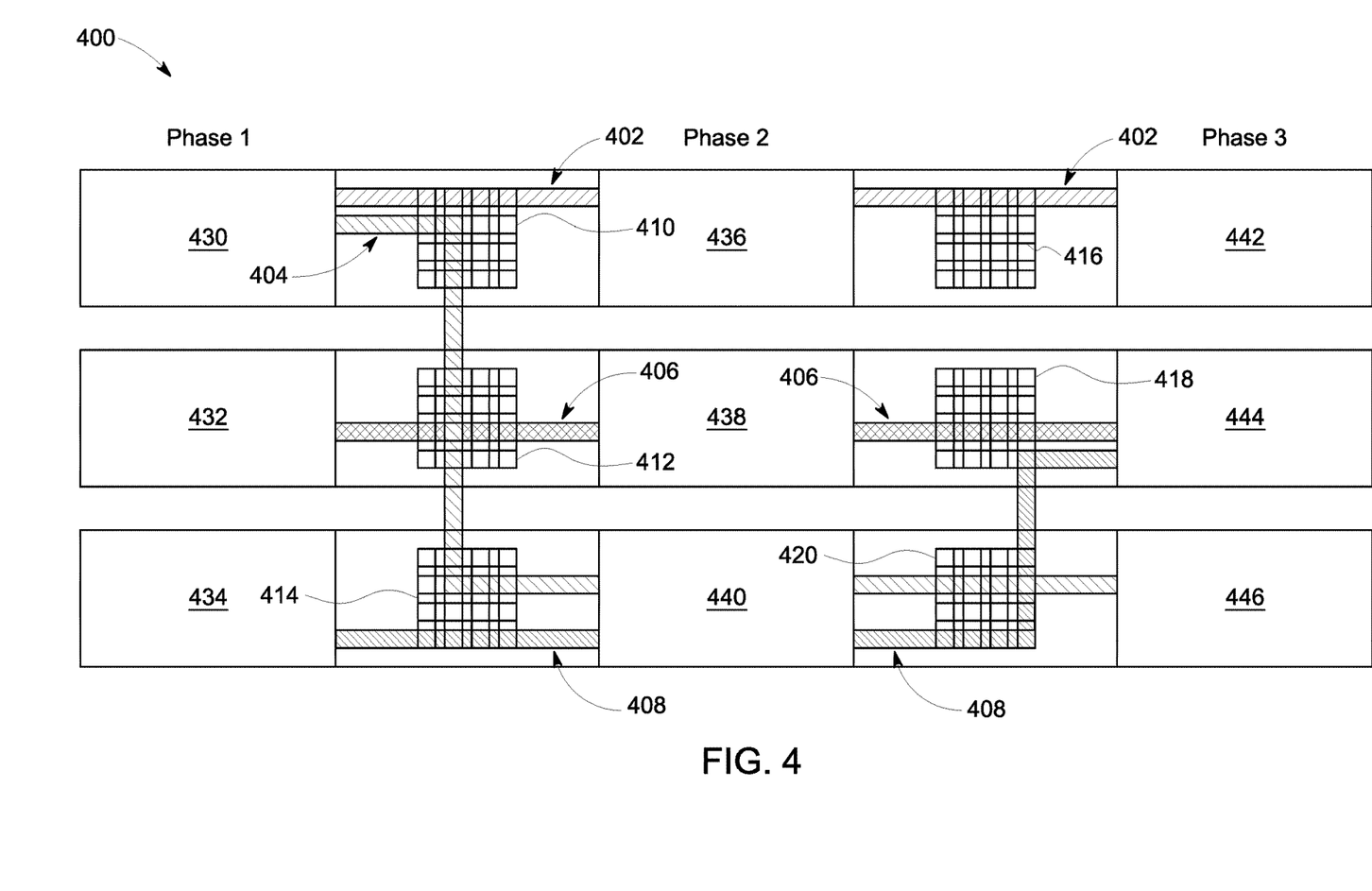
FIG. 4 illustrates an exemplary visual representation including a plurality of grids.

The path of an interconnecting line of a visual representation can be based on one or more grids comprising rows and columns. The number of rows and columns in the grids can be indicative of the number of the plurality of scenarios (e.g., proportional to the number of the plurality of scenarios). FIG. 4 illustrates an exemplary visual representation 400 including a plurality of grids that can determine the paths of the interconnecting lines. The visual representation 400 includes visual representations of four scenarios indicated by interconnecting lines 402 (color coded red), 404 (color coded orange), 406 (color coded green) and 408 (color coded blue). In some implementations, each line 402, 404, 406, 408 can be color coded or otherwise include a visual characteristic (e.g., dotted or dashed to visually distinguish the lines). The interconnecting lines connect models (e.g., 430, 432, 434, and the like) of various model types (e.g., Model type 1, Model type 2, Model type 3, and the like). Models of a given model type are arranged in columns ("model type columns"). The model type columns can be separated by grid columns that can include the various grids (e.g., 410-420). The rows and columns of the grids can be used to determine the path of the various interconnecting lines. A given row or a column of each of the grids (e.g., 410-420) is assigned to an interconnecting line (e.g., interconnecting line 402). In some implementations, the grids (e.g., 410-420) that are used to determine the path of the interconnecting lines are not displayed in the visual representation.

Figure 5A:
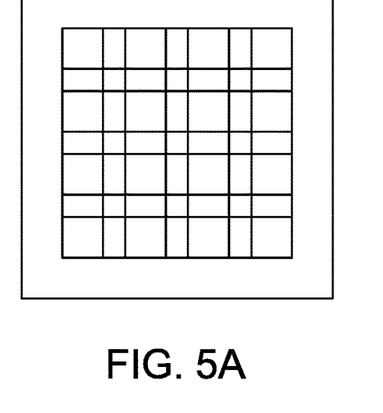
FIG. 5A illustrates an exemplary grid comprising rows and columns.

FIGS. 5A-E illustrate exemplary assignments of rows and columns of a grid (e.g., grids 410-420) to the various interconnecting lines (e.g., indicative of assignment to various scenarios). The width of the columns and the height of the rows can be determined based on the thickness of the interconnecting lines. FIG. 5A illustrates an exemplary grid comprising rows and columns that can be assigned to the interconnecting lines. The grid can include an outer margin that surrounds the row and column matrix of the grid. The grid can include inside margins that can separate rows (or columns) in the grid. FIG. 6 illustrates exemplary components of the grid in FIG. 5A. The grid in FIG. 5A can be a superposition of a first grid including four columns (separated by three inner margins separating the columns) and a second grid including four rows (separated by three inner margins separating the rows). The inner margins can prevent two interconnecting lines from touching or overlapping spatially. This can allow for a clear visual representation of the various scenarios by allowing a user to distinguish between interconnecting lines.

Figure 7:
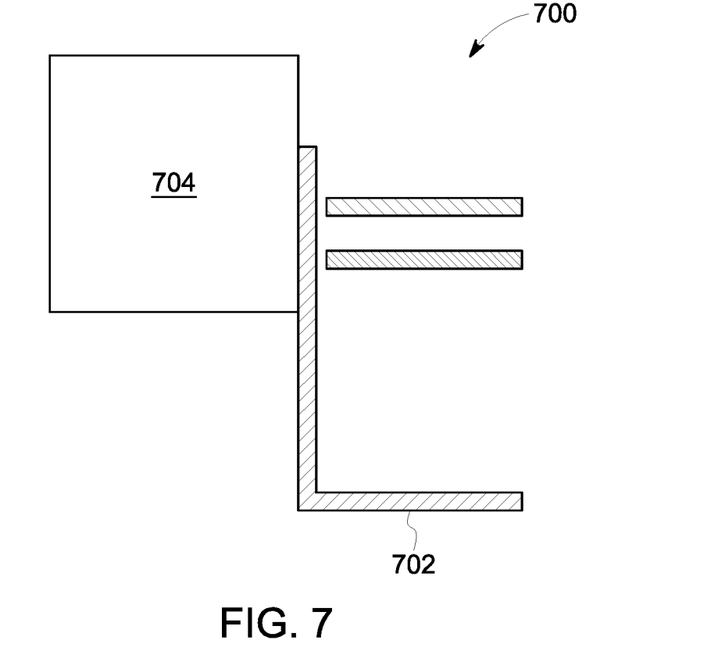
FIG. 7 illustrates an exemplary interconnecting line that turns a corner at a close proximity to a graphical object.

The outer margin can prevent an interconnecting line from turning a corner (e.g., at right angles) at a close proximity to the graphical object. For example, the outer margin can prevent an interconnecting line that touches a graphical object from turning (e.g., taking a left/right turn) at a close proximity to a graphical object. FIG. 7 illustrates an exemplary interconnecting line 702 that turns a corner at a close proximity to the graphical object 704. A visual representation of scenarios that includes FIG. 7 may confuse a user (e.g., make it difficult for a user to keep track of the various scenarios).

Figure 5B:
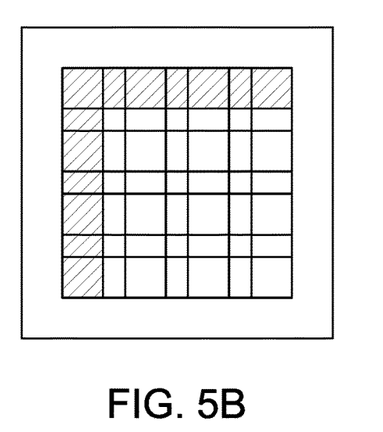
FIG. 5B illustrates an exemplary assignment of the first row and first column of the grid in FIG. 5A to a first scenario.
Figure 5C:
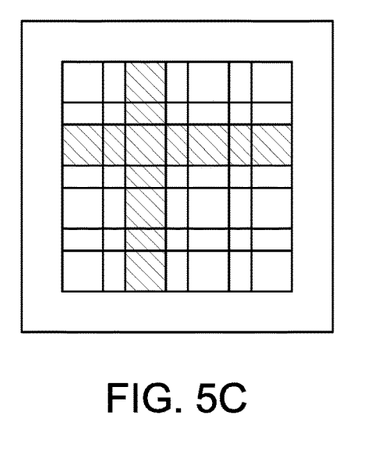
FIG. 5C illustrates an exemplary assignment of the second row and second column of the grid in FIG. 5A to a second scenario.
Figure 5D:
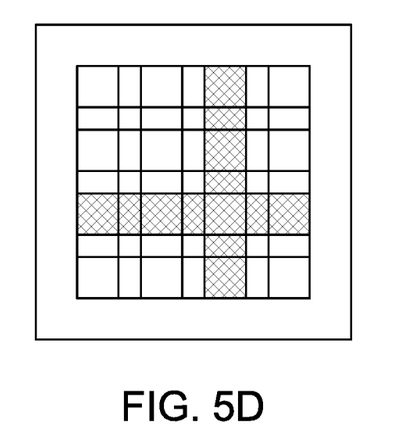
FIG. 5D illustrates an exemplary assignment of the third row and third column of the grid in FIG. 5A to a third scenario.
Figure 5E:
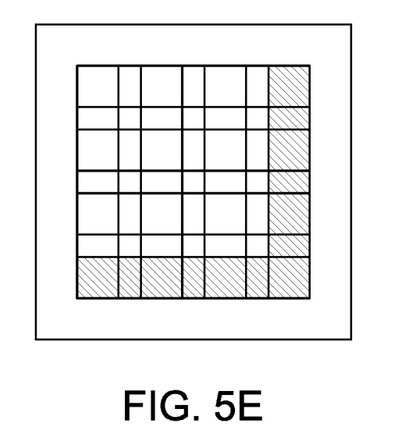
FIG. 5E illustrates an exemplary assignment of the fourth row and fourth column of the grid in FIG. 5A to a fourth scenario.
Figure 6:
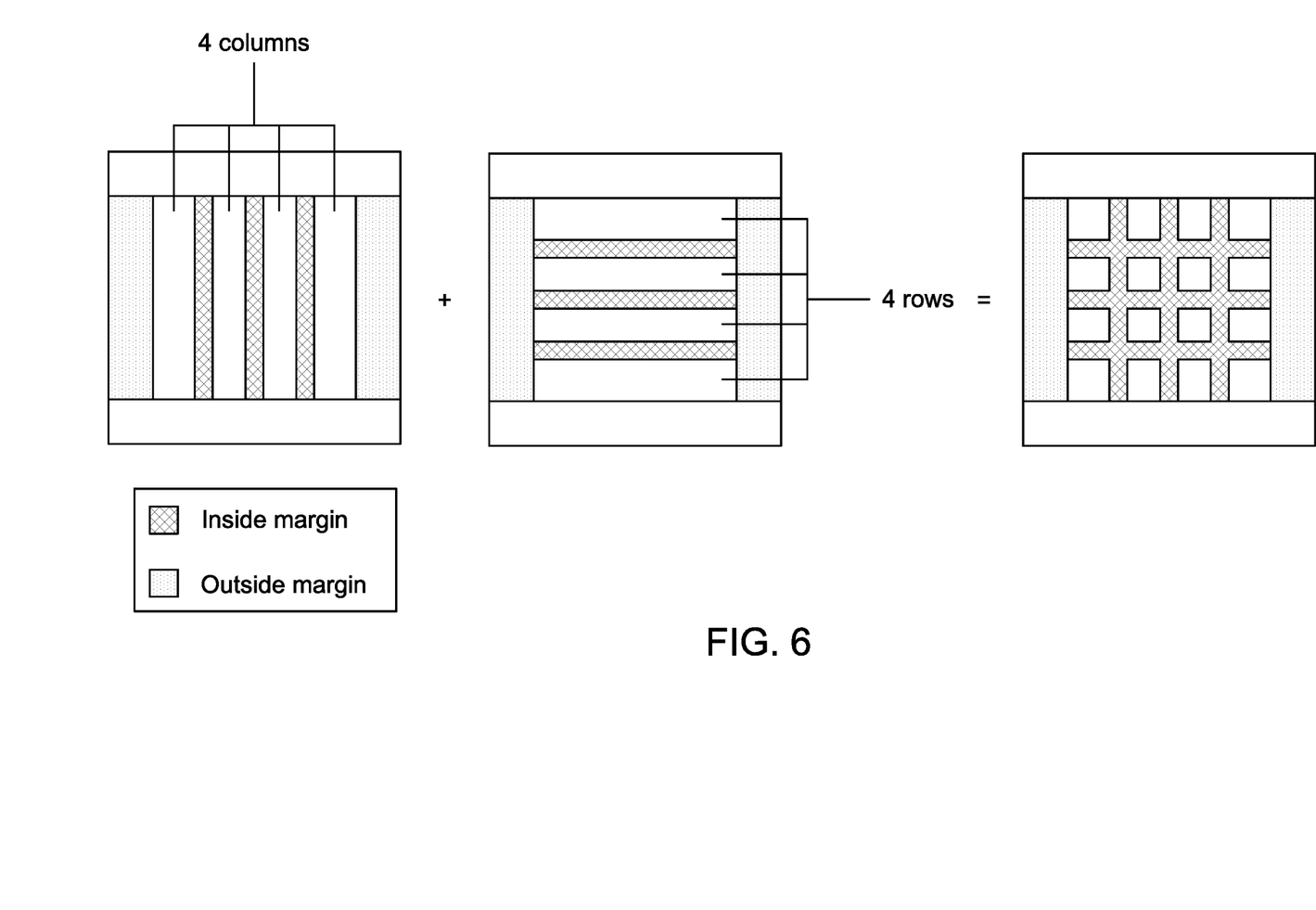
FIG. 6 illustrates exemplary components of the grid in FIG. 5A.

FIG. 5B illustrates an exemplary assignment of the first row and first column to the first interconnecting line 402. FIG. 5C illustrates an exemplary assignment of the second row and second column to the second interconnecting line 404. FIG. 5D illustrates an exemplary assignment of the third row and third column to the third interconnecting line 406. FIG. 5E illustrates an exemplary assignment of the fourth row and fourth column to the fourth interconnecting line 408. In some implementations, every grid in the visual representation can have the same assignment. For example, the first row and the first column of every grid (e.g., grids 410-420) in the visual representation can be assigned to the first interconnecting line 402; the second row and the second column of every grid (e.g., grids 410-420) in the visual representation can be assigned to the second interconnecting line 402, and the like.

The path of an interconnecting line passing through a grid (e.g., one of the grids 410-420) will spatially coincide (e.g., partially or entirely) with the assigned row and/or column of one or more grid. For example, visual representation 400 illustrates a first visual representation including graphical objects 430, 436 and 442 and interconnecting line 402. The path of the interconnecting line 402 coincides with (or overlays on) the first row of the grids 410 and 416. The visual representation 400 illustrates a second visual representation including graphical objects 430, 440 and 446, and interconnecting line 404. The path of the interconnecting line 404 coincides with (or overlays on) a portion of the second row and the second column of the grid 410; the second row of the grid 412; a portion of the second column and second row of the grid 414; and the second row of the grid 420. The first and the second visual representation can include a common graphical object (e.g. graphical object 430).

Figure 8:
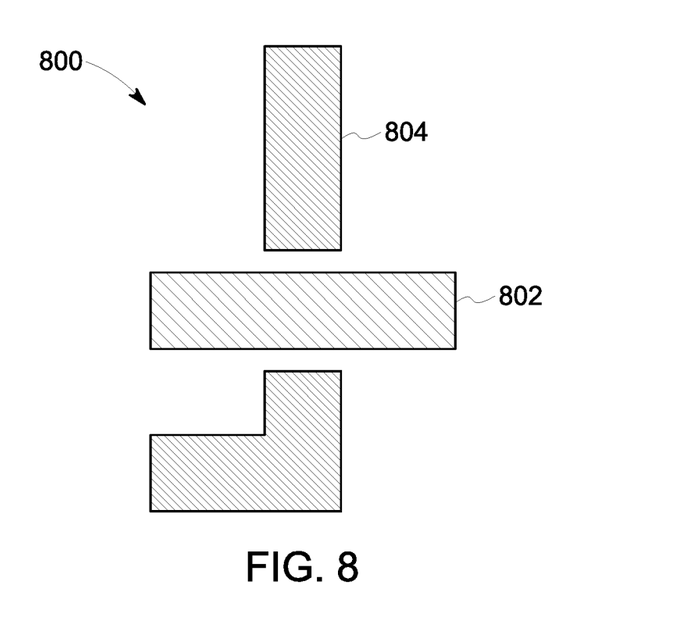
FIG. 8 illustrates an exemplary intersection between two interconnecting lines.

The visual representation 400 illustrates a third visual representation including graphical objects 432, 438 and 444, and third interconnecting line 406 that is assigned to the third row of grids 412 and 418. The second interconnecting line 404 and the third interconnecting line 406 can intersect (e.g., at right angles). In the region of intersection, the second interconnecting line 404 can be overlaid on the third interconnecting line (e.g., the second interconnecting line 404 can be displayed above the third interconnecting line 406 in the region of intersection). In some implementations, the determination that the second interconnecting line 404 overlays the third interconnecting line 406 can be based on a predetermined index (e.g., Z-index). The predetermined index can include priority index values associated with the various scenarios. Based on the priority index values of the interconnecting lines, determination can be made as to which interconnecting line will receive a priority (e.g., which of the two interconnecting lines will be contiguously displayed). FIG. 8 illustrates an exemplary intersection between interconnecting lines 802 and 804. Based on the priority index values of interconnecting lines 802 and 804, the interconnecting line 802 can be displayed above the interconnecting line 804.

Figure 9:
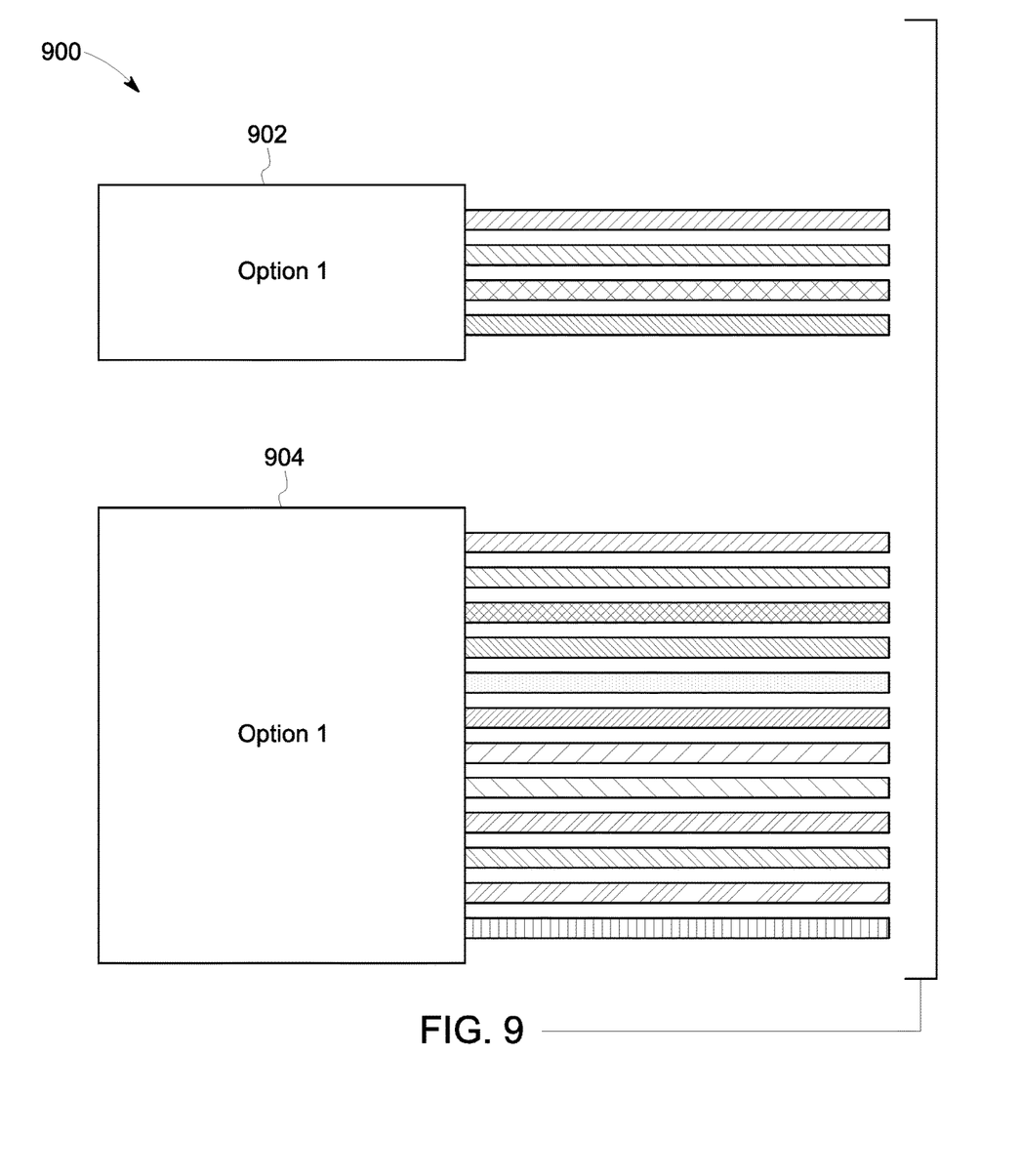
FIG. 9 illustrates exemplary embodiments of two graphical objects associated with different number of scenarios.

The size of a graphical object in the visual representation of scenarios can depend on the number of scenarios associated with the graphical object (e.g., a common graphical object representative of a model common to multiple scenarios.). FIG. 9 illustrates exemplary embodiments of two graphical objects associated with different number of scenarios. The first graphical object 902 (indicative of a first model) is associated with four scenarios (represented by four interconnecting lines touching the graphical object 902. The second graphical object 904 (indicative of a second model) is associated with twelve scenarios (represented by twelve interconnecting lines touching the second graphical object 904). In some implementations, the size of the graphical object can be proportional to a number of scenarios associated with the graphical object. For example, graphical object 904 associated with twelve scenarios can be larger than the graphical object 902 associated with four scenarios.

Returning to FIG. 1, at 106, the first visual representation of the first scenario (e.g., visual representation including graphical objects 430, 436 and 442 and interconnecting line 402) can be displayed in a GUI display space. In some implementations, a second visual representation of the second scenario (e.g., visual representation including graphical objects 430, 440 and 446, and interconnecting line 404) can be displayed in the GUI display space (e.g., superimposed on the first visual representation). In some implementations, the various visual representations (e.g., associated with interconnecting lines 402, 404, 406, 408, and the like) can be simultaneously displayed on the GUI display space. In some implementations, the various visual representations can be sequentially displayed on the GUI display space.

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web interface through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A method comprising:
    receiving data characterizing a plurality of scenarios, wherein a first scenario of the plurality of scenarios includes a first plurality of models associated with a plurality of model types;
    determining a first visual representation of the first scenario for display in a graphical user interface (GUI) display space, the first visual representation including a first plurality of graphical objects indicative of the first plurality of models, the first plurality of graphical objects arranged in a plurality of columns indicative of the plurality of model types, wherein the first plurality of graphical objects are connected by a first line, a first path of the first line in the GUI display space is based on one or more grids comprising a first number of rows indicative of number of the plurality of scenarios, wherein a first row and a first column of each of the one or more grids is assigned to the first line; and
    displaying, in the GUI display space, the first visual representation.

2. The method of claim 1, further comprising:
    determining a second visual representation of a second scenario of the plurality of scenarios, the second scenario including a second plurality of models associated with the plurality of model types,
        wherein the second visual representation includes a second plurality of graphical objects indicative of the second plurality of models, the second plurality of graphical objects arranged in the plurality of columns,
        wherein the second plurality of graphical objects are connected by a second line, a second path of the second line in the GUI display space is based on the one or more grids, wherein a second row and a second column of each of the one or more grids is assigned to the second line;
    displaying, in the GUI display space, the second visual representation.

3. The method of claim 2, wherein the first plurality of models and the second plurality of models include a common model, and the first plurality of graphical objects and the second plurality of graphical objects include a common graphical object representative of the common model, the common graphical object connected to the first line and the second line in the GUI display space.

4. The method of claim 3, wherein a size of the common graphical object is proportional to a number of scenarios of the plurality of scenarios that includes the common model.

5. The method of claim 2, wherein the first line is characterized by a first color indicative of the first scenario and the second line is characterized by a second color indicative of the second scenario.

6. The method of claim 2 further comprising:
    determining the first path of the first line, the determining comprising:
        assigning a first row of a first grid of the one or more grids and a first column of the first grid to the first scenario,
        assigning a first row of a second grid of the one or more grids and a first column of the second grid to the first scenario; and
    determining the second path of the second line, the determining comprising:
        assigning a second row of the first grid and a second column of the first grid to the second scenario,
        assigning a second row of the second grid and a second column of the second grid to the second scenario,
        wherein the first path of the first line includes the first row and the first column of the first grid and the first row and the first column of the second grid, and the second path of the second line includes the second row and the second column of the first grid and the second row and the second column of the second grid.

7. The method of claim 6, wherein a first graphical object of the first plurality of graphical objects is displayed in a first column of the plurality of columns and a second graphical object of the first plurality of graphical objects is displayed in a second column of the plurality of columns, and the first grid and the second grid are displayed in a third column of the plurality of columns, wherein the first visual representation includes the first column, the second column and the third column and the third column is located between the first column and the second column.

8. The method of claim 6, wherein the first line and the second line intersect at right angles.

9. The method of claim 8, wherein the first line is configured to overlay the second line at the intersection of the first line and the second line.

10. The method of claim 9, further comprising determining that the first line overlays the second line based on a predetermined index indicative of priorities associated with the plurality of scenarios, wherein the predetermined index includes a first priority value associated with the first scenario and a second priority value associated with the second scenario.

11. A system comprising:
at least one data processor;
memory coupled to the at least one data processor, the memory storing instructions to cause the at least one data processor to perform operations comprising:
receiving data characterizing a plurality of scenarios, wherein a first scenario of the plurality of scenarios includes a first plurality of models associated with a plurality of model types;
determining a first visual representation of the first scenario for display in a graphical user interface (GUI) display space, the first visual representation including a first plurality of graphical objects indicative of the first plurality of models, the first plurality of graphical objects arranged in a plurality of columns indicative of the plurality of model types, wherein the first plurality of graphical objects are connected by a first line, a first path of the first line in the GUI display space is based on one or more grids comprising a first number of rows indicative of number of the plurality of scenarios, wherein a first row and a first column of each of the one or more grids is assigned to the first line; and
displaying, in the GUI display space, the first visual representation.

12. The system of claim 11, wherein the operations further comprising:
determining a second visual representation of a second scenario of the plurality of scenarios, the second scenario including a second plurality of models associated with the plurality of model types,
wherein the second visual representation includes a second plurality of graphical objects indicative of the second plurality of models, the second plurality of graphical objects arranged in the plurality of columns,
wherein the second plurality of graphical objects are connected by a second line, a second path of the second line in the GUI display space is based on the one or more grids, wherein a second row and a second column of each of the one or more grids is assigned to the second line;
displaying, in the GUI display space, the second visual representation.

13. The system of claim 12, wherein the first plurality of models and the second plurality of models include a common model, and the first plurality of graphical objects and the second plurality of graphical objects include a common graphical object representative of the common model, the common graphical object connected to the first line and the second line in the GUI display space.

14. The system of claim 13, wherein a size of the common graphical object is proportional to a number of scenarios of the plurality of scenarios that includes the common model.

15. The system of claim 12, wherein the first line is characterized by a first color indicative of the first scenario and the second line is characterized by a second color indicative of the second scenario.

16. The system of claim 12, wherein the operations further comprising:
determining the first path of the first line, the determining comprising:
assigning a first row of a first grid of the one or more grids and a first column of the first grid to the first scenario,
assigning a first row of a second grid of the one or more grids and a first column of the second grid to the first scenario; and
determining the second path of the second line, the determining comprising:
assigning a second row of the first grid and a second column of the first grid to the second scenario,
assigning a second row of the second grid and a second column of the second grid to the second scenario,
wherein the first path of the first line includes the first row and the first column of the first grid and the first row and the first column of the second grid, and the second path of the second line includes the second row and the second column of the first grid and the second row and the second column of the second grid.

17. The system of claim 16, wherein a first graphical object of the first plurality of graphical objects is displayed in a first column of the plurality of columns and a second graphical object of the first plurality of graphical objects is displayed in a second column of the plurality of columns, and the first grid and the second grid are displayed in a third column of the plurality of columns,
wherein the first visual representation includes the first column, the second column and the third column and the third column is located between the first column and the second column.

18. The system of claim 16, wherein the first line and the second line intersect at right angles.

19. The system of claim 18, wherein the first line is configured to overlay the second line at the intersection of the first line and the second line.

20. The system of claim 19, wherein the operations further comprising:
determining that the first line overlays the second line based on a predetermined index indicative of priorities associated with the plurality of scenarios, wherein the predetermined index includes a first priority value associated with the first scenario and a second priority value associated with the second scenario.

* * * * *